May 4, 1954
L. S. REID
2,677,438
PROCESS FOR REMOVAL OF WATER AND WATER VAPOR
FROM A STREAM OF HIGH PRESSURE GAS
Filed May 14, 1949
2 Sheets-Sheet 2
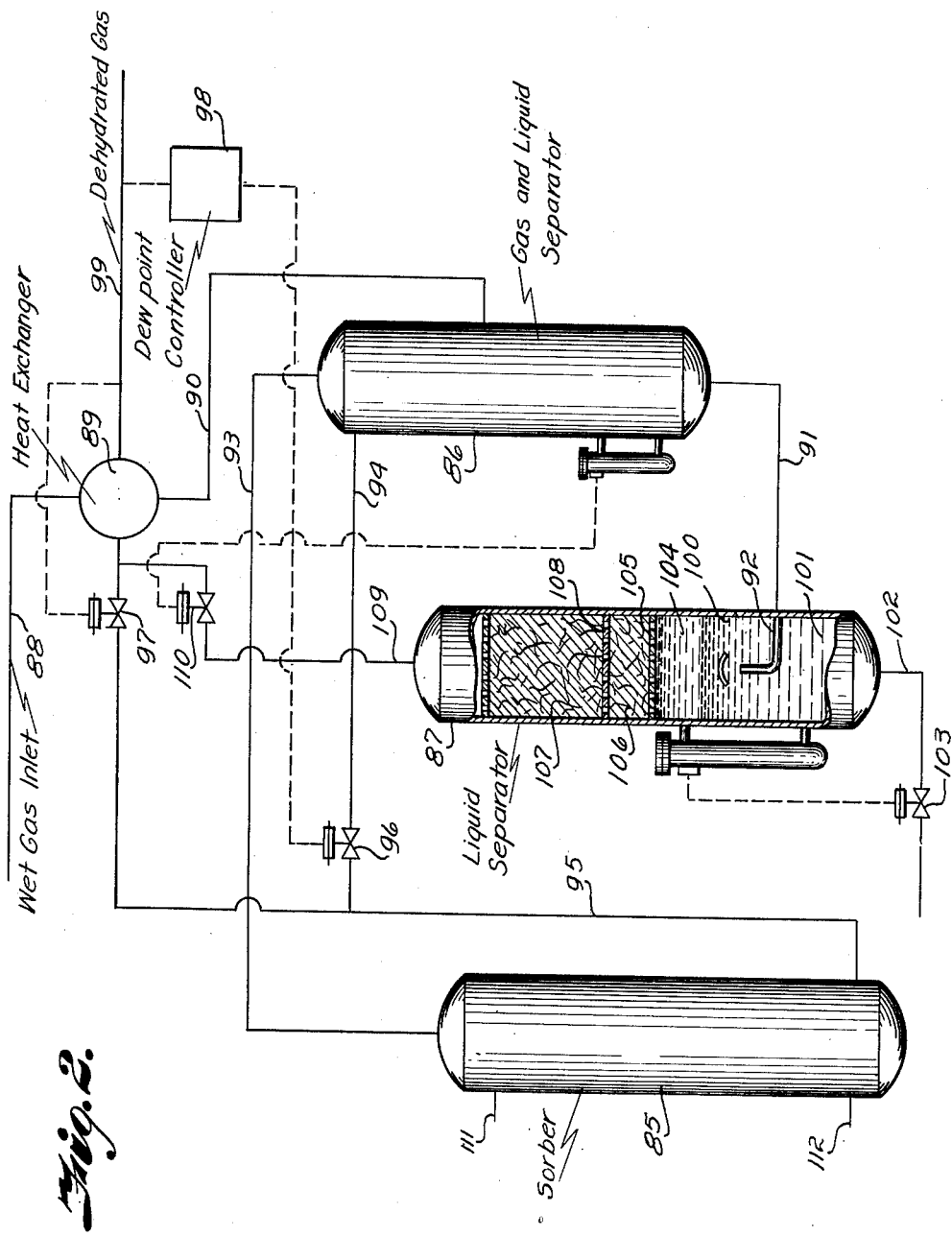
Inventor
Laurance S. Reid
By Fishburn & Mullendore
Attorneys Patented May 4, 1954

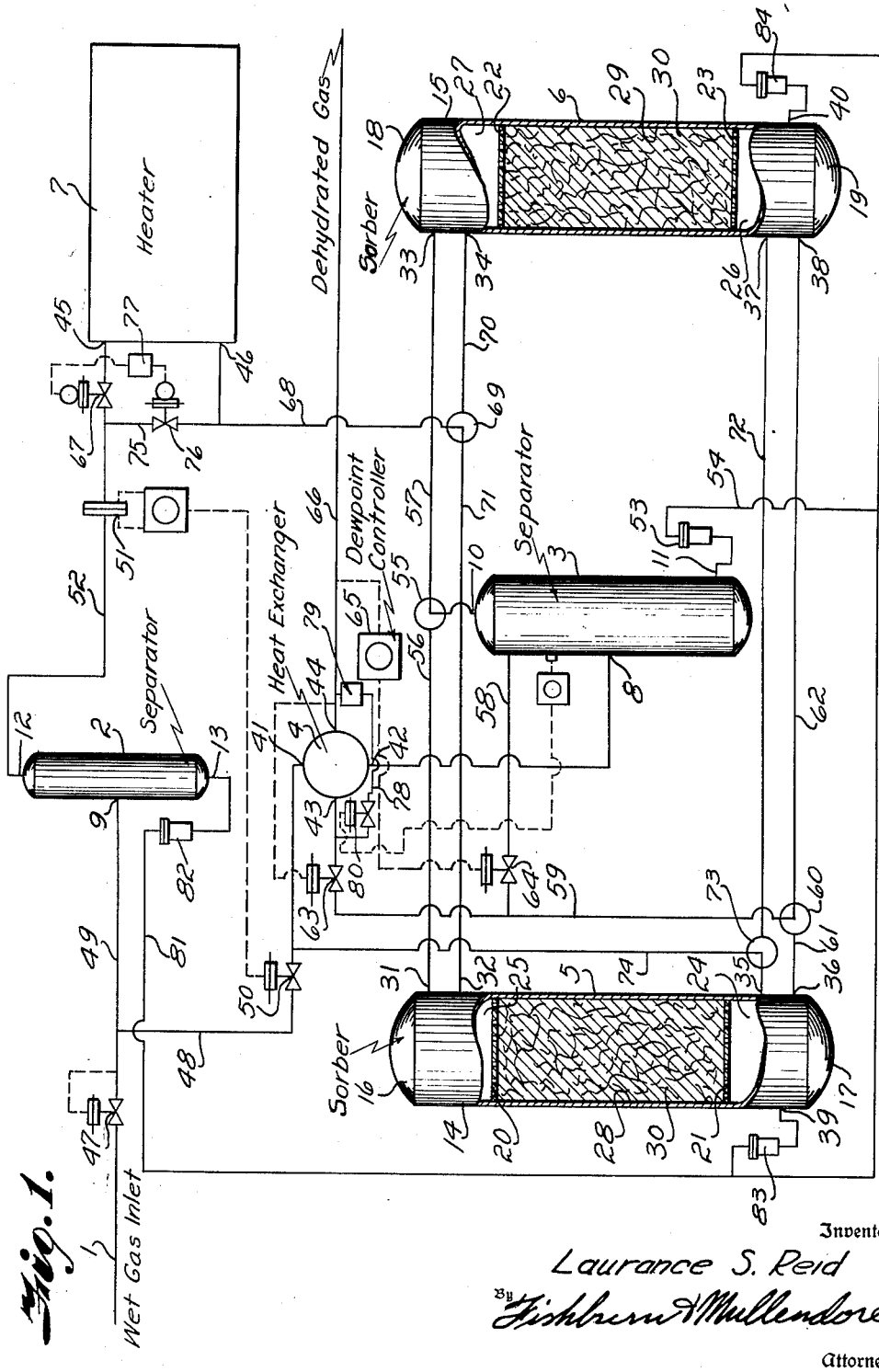

2,677,438

UNITED STATES PATENT OFFICE 2,677,438

PROCESS FOR REMOVAL OF WATER AND WATER VAPOR FROM A STREAM OF HIGH PRESSURE GAS

Laurance S. Reid, Norman, Okla.

Application May 14, 1949, Serial No. 93,374

20 Claims. (Cl. 183—114.2)

This invention relates to a process and apparatus for complete or partial removal of water and water vapor from a stream of high pressure gas at a point near its source in order to eliminate formation of gas hydrates and the resultant interruption of flow caused by accumulation of these solids in the flow system.

Natural gas is produced from wells at surface pressures which have been observed to be as high as 6000 pounds per square inch. Since this gas originates in subsurface reservoirs containing water at temperatures as high as 300° F., it is usually saturated with water vapor at the temperature and pressure of the reservoir as it flows to the well bore. On rising to the surface by way of the well tubing, some cooling is effected through normal expansion of the gas and heat transfer to cooler strata penetrated by the well, so that it is not uncommon for some water vapor to condense in the flow string and be produced in liquid phase at the surface. This liquid water may be separated from the gas and removed, but the gas still contains substantial quantities of water vapor which must be removed if formation of gas hydrates is to be prevented in cooler portions of the flow system.

Intensive studies of the formation of gas hydrates reveal that these substances are formed at temperatures ranging from 32° F. at near atmospheric pressure, at approximately 64° F. at 1000 pounds per square inch, at approximately 78° F. at 2000 pounds per square inch, etc. Present production practice frequently calls for transmission of gas at these higher pressures which, in turn, increases the difficulties due to gas hydrate formation and subsequent service interruptions.

The usual method for controlling hydrate formation prior to the present invention has been to heat the gas prior to and during transmission in pipe lines; but this practice has been found to be relatively ineffective and exceedingly expensive. Also, a variety of processes for dehydrating natural gas mixtures has been proposed and developed, employing various liquid and solid sorbents. However, the economics of process design have been such that it is feasible to erect only one relatively large dehydrating unit to process the gas produced from a plurality of wells. In the latter processes employing a main dehydration plant, the gas transported in high pressure gas lines has been dehydrated effectively, but the gathering lines connecting individual wells with the large plant have remained unprotected and subject to gas hydrate formation troubles. It is obvious, therefore, that dehydration at the well head would be most effective and desirable if such an operation were economically feasible.

It is, therefore, a principal object of the present invention to provide an ecomonical method for dehydrating the gas at or near the well and at substantially well head pressure.

Other objects of the invention are to provide an apparatus which may be constructed for effective separation and removal from the gas stream of the liquid hydrocarbon condensate and liquid water; to provide for controlling the moisture content or dew point of the effluent gas; to provide a small compact dehydration unit which may be operated either manually or automatically and thus require a minimum of operating attendance; to recombine the separated hydrocarbon liquid with the dehydrated gas so that both hydrocarbon liquid and gas may be flowed in a common gas line to a central gas processing plant; to provide for operation at pressures substantially above the gathering system pressure in order to condense and remove from the system a maximum quantity of water vapor prior to passing the gas over the desiccant; and to provide for expanding the dehydrated gas to gathering system pressure and thereby utilize the effect of refrigeration in precooling the entering gas and increasing the condensation prior to contact of the gas with a desiccant.

In accomplishing these and other objects of the invention hereinafter pointed out, I have provided improved apparatus, the preferred forms of which are illustrated in the accompanying drawings wherein:

Fig. 1 is a diagrammatic view of an apparatus for dehydrating gas at or near the well head.

Fig. 2 is a similar diagrammatic view of a modified form of the apparatus wherein condensed hydrocarbons are reunited with the dehydrated gas.

Referring more in detail to the drawings:

1 designates a pipe line for conducting a stream of natural gas from its source, for example, one or more wells producing gas at substantially high pressures to a system of lower pressure gathering lines leading to a common processing plant or a gas transportation system in which the gas is transported to a distant market. Since natural gas usually originates in subsurface reservoirs containing water at temperatures and pressures favorable to saturation, the gas discharged from the well contains substantial quantities of water vapor which condenses in cooler parts of the pipe line system and the condensate reacts with components of the gas to form hydrates. These hydrates comprise solids that accumulate in the lines and interfere with movement of the gas. The present invention contemplates removal of the water and water vapor at or near the well head so that the gas may flow through the various lines leading from the well to the source of disposal without interruption and hazards caused by hydrate formations.

The apparatus illustrated in Fig. 1 comprises liquid separators 2—3, a heat exchanger 4, sorbers 5—6 and a gas heater 7 in addition to the various interconnecting pipes and controls hereinafter more fully described. The separators 2 and 3 may be of any construction suitable for separating free liquid and condensate so that the gas discharged therefrom is substantially free of entrained liquids. Since the equipment deals with treatment of the gas near the source the various vessels require relatively small capacity and therefore may be tubular in formation and of sufficiently small diameter to safely accommodate high operating pressures with low investment costs. For example, the separators may comprise small diameter elongated cylindrical vessels as illustrated. The vessels are provided with gas inlets 8—9 and liquid and gas outlets 10—11 and 12—13, respectively.

The sorbers 5—6 may also comprise elongated vessels having cylindrical walls 14—15 of relatively small diameters and closed at the ends by heads 16—17 and 18—19, respectively. Spaced inwardly within the vessels are transverse partitions 20—21 and 22—23 to provide inlet and outlet chambers 24—25 and 26—27 at the respective ends and intermediate chambers 28—29 containing desiccant 30. The partitions 20, 21, 22 and 23 being perforated to allow for distributed flow of the gas through the desiccant while retaining the desiccant therebetween. The chambers 25—27 are provided with flow connections 31—32 and 33—34 respectively while the chambers 24 and 26 are provided with flow connections 35—36 and 37—38. The chambers 24 and 26 also have liquid outlet connections 39—40 for removing any liquid that may accumulate within the respective chambers. The heat exchanger 4 may be of any suitable type wherein incoming gas may flow from an inlet connection 41 to an outlet connection 42 in heat exchange relation with an outgoing stream of dried gas flowing from an inlet 43 to an outlet 44. The heater 7 may also be of any high pressure type suitable for heating a continuous stream of gas as it is passed therethrough by way of an inlet connection 45 and an outlet connection 46. The desiccant may be of the solid type and comprises any one of the well-known desiccants capable of reactivation for example, activated bauxite, activated alumina, and alumina-silica gels which are readily available and sold under various trade names.

The gas flow from the well is conducted by way of the pipe 1 through a pressure reducing regulator 47 to branch ducts 48—49 leading to the inlet connections 8—9 of the respective separators 3—2. The flow of gas is thus divided into primary and secondary streams with the major volume of gas flowing through the branch 48 and the minor flow through the branch 49. The controlled flow is effected by connection of a flow regulating valve 50 into the branch 48 that is controlled by a recording flow controller 51 located in the gas outlet duct 52 that leads from the gas outlet connection 12 of the separator 2.

The secondary flow is set at a predetermined rate, either manually or by the automatic recording controller 51 so that a constant supply of gas is available for heating and subsequently cooling the desiccant bed during reactivation. The primary flow rate may vary from time to time. The inlet and outlet connections 41 and 42 of the heat exchanger 4 are connected into the branch 48 so that the gas flow is brought to a relatively low temperature in the heat exchanger for effecting condensation of hydrocarbon and water vapor content of the gas which on passing into the separator 3 separates from the gas and is discharged through the outlet connection 11 under control of a liquid level regulating valve 53 by way of a pipe 54. A portion of the gas relieved of the condensed liquids may be discharged from the separator 3 through the gas outlet connection 10 to a 3-way valve 55 by which the gas may be led through pipe 56 or 57 to the inlet connection 31 or 33 of the respective sorber 5 or 6, depending upon setting of the valve 55. For example, when the valve is set to connect with the pipe 57 and the gas containing water vapor is discharged into the chamber 27 for distributed flow through the desiccant material which sorbs the vapor content of the gas and the gas passing into the chamber 26 is dry gas which is discharged from the connection 38. If, instead of maximum dehydration, partial dehydration to a higher controlled effluent gas dew point is desired, a portion of the gas from separator 3 may be bypassed around the sorbers. This is effected by discharging a part of the gas from the separator through an outlet duct 58 that connects with a dry gas duct 59 leading to a 3-way valve 60 which connects with the outlet connections 36 and 38 of the respective absorbers by ducts 61 and 62.

The dry gas stream thus mixes with the wet gas stream discharged from the separator to reduce the total water vapor content of the mixture prior to discharge through an expansion valve 63 whereby the gas is expanded down to a lower pressure and thereby chilling the gas to be used as a coolant in the heat exchanger 4 to cool the incoming gas. The mixture of the gas streams may be regulated to a predetermined dew point by providing the pipe 58 with a regulating valve 64 that is under control of a dew point recorder and controller 65 activated by the gas stream flowing through a discharge line 66 that is connected with the discharge connection 44 of the heat exchanger and which conducts the dried gas having a dew point corresponding with the set value of the recorder 65 to the gathering system lines which lead the gas to processing plant or gas transportation lines.

Whether or not the gas is dehydrated to a maximum extent, it is obvious that the cooling effect created by expansion of the dehydrated gas provides the refrigerant or coolant necessary in reducing the temperature of the incoming wet gas to the point at which much of the contained water vapor is condensed and separated in the separator 3, thereby relieving the load on the respective sorbers.

After a time the sorbent bed approaches saturation and to maintain a continuous action on the gas it is necessary to change the settings of the valves 55 and 60 whereby the gas stream from the separator is diverted through the pipe 56 and the dried gas after passing through the desiccant body in the sorber 5 is discharged through the pipe 61 and valve 60 into the pipe 59. It then becomes necessary to reactivate the desiccant in the chamber 29 and for this purpose the secondary stream of gas discharged through the pipe 52 is conducted through a control valve 67 to the inlet connection 45 of the heater 7 and wherein the gas is heated to provide a heating and drying medium which is discharged through the outlet connection 46 to a pipe 68 that is connected with a 3-way valve 69 to connect the pipe 68 with flow pipes 70 and 71 leading to the inlet connections 32 and 34 of the respective sorbers. For example, assuming that the wet gas has been diverted from the sorber 6 to the sorber 5, the valve 69 is set to direct the hot gas through the saturated desiccant to effect release of the moisture on the desiccant which is carried by the heated gas through a pipe 72 that is connected with the outlet connection 37 and which leads to a 3-way valve 73 that is also connected with the outlet connection 35 of the sorber 5, the valve 73 being set so that the wet gas is discharged through a pipe 74 that connects with the branch pipe 48 on the outlet side of the control valve 50. The wet gas is thus passed along with the incoming primary gas stream through the heat exchanger 4 wherein temperature is reduced to the condensation point of the contained moisture, which condensate is removed in the separator 3 along with the condensate resulting from cooling of the primary gas stream. The gas used for reactivation purposes is thus returned to the primary gas flow for treatment along with the primary gas stream.

After the sorbent bed becomes substantially dry, the secondary stream of gas is diverted from flow through the heater 7 by means of a bypass 75 under control of a valve 76 that is operably connected with the valve 67 through a time cycle or maximum temperature controller 77. Thus, by setting the controller 77 drying and cooling periods are automatically controlled, a portion of the cool gas being discharged through the bypass 75 upon opening of the valve 76 and closure of the valve 67. After the bed has cooled sufficiently to permit reversing of the drying cycle, the 3-way valves 55, 69, 60 and 73 are re-set so as to pass the gas stream to be treated through the adsorber 6 while the sorber 5 is reactivated.

In order to control temperature of the wet gas cooled in the heat exchanger, the heat exchanger is provided with a bypass 78 by which a portion of the expanded gas may be bypassed around the heat exchanger so that the gas flowing through the heat exchanger is only sufficient to maintain a predetermined temperature in the separator under control of a temperature regulator 79 that operates a valve 80 controlling flow through the bypass. It is thus obvious that a constant temperature of the gas may be maintained in the separator 3, while maintaining a predetermined discharge pressure of the dried gas, by automatically bypassing a portion of the expanded gas sufficient to maintain a predetermined temperature in separator 3.

Any free water collected in the separator 2 is removed through the outlet connection 13 and pipe 81. The flow from the separator is maintained by a constant level control valve 82. Any liquid accumulated in the lower portions of the sorbers 5 and 6 is similarly discharged through the outlet connections 39 and 40 by way of constant level control valves 83 and 84 which are connected with the liquid discharge line 81.

In this form of the invention both the condensed water vapor and hydrocarbons which condense at the temperature maintained in the separator 3 are removed from the gas and are run to storage. If it is desired to transport both gas and hydrocarbon liquid in a simple gathering line, the condensed hydrocarbons and water may be separated and the liquid hydrocarbons added to the dry gas stream. This is effected by the apparatus illustrated in Fig. 2 wherein 85 designates a dehydrator, 86 a separator for separating the gas and condensate, and 87 a separator for separating the condensed hydrocarbon from the condensed water. In this form of the invention the gas from the source is conducted through pipe 88 and heat exchanger 89 where the temperature is reduced to effect condensation of much of the water vapor carried in the gas stream. The cooled gas and condensate are discharged through a pipe 90 into the separator 86 wherein the liquid resulting from cooling of the stream separates and is discharged from the separator through a pipe 91 leading to an inlet 92 of the separator 87. The separated gas is discharged from the separator 86 in separate streams through pipes 93 and 94, the pipe 93 leading to the sorber 85 wherein the water vapor content of the gas is removed and the dried gas is discharged through a pipe 95 leading to the heat exchanger 89.

The pipe 94 is connected with the pipe 95 through a control valve 96 similar to the control valve 63 previously described where the gas streams are mixed to reduce the overall water vapor content prior to passage of the combined flow through the expansion valve 97 whereby the gas is expanded to provide the cooling medium for the incoming gas as in the first described form of the invention.

In this form the streams of dry and wet gas may be automatically controlled by actuating the valve 96 by means of a dew point controller 98 that is energized by the flow of dehydrated gas discharged through the pipe 99. The separator 87 includes a separating or settling chamber 100 wherein the water separates from the liquid hydrocarbon and collects in a body 101 on the bottom of the separator for discharge through a pipe 102 under control of a valve 103 that is actuated by the water level maintained in the separator, the separated liquid hydrocarbon being lighter collects in a body 104 on top of the water 101 and rises through a perforated partition 105 into contact with a filter or hay section 106 to remove the major portion of any water that may be carried therewith. After passing through the hay section 106 the liquid hydrocarbon rises through a body of dehydrating material 107 that is carried above the hay section on a perforated partition 108 to assure discharge of dry hydrocarbon liquid from the separator. The dry liquid is discharged through an outlet pipe 109 that is connected with the gas line 95 on the discharge side of the expansion valve 97. Discharge of the liquid hydrocarbon into the line may be automatically regulated by providing the pipe 109 with a control valve 110 that is actuated responsive to the liquid level maintained in the separator 86.

In this form of the invention the dehydrator 85 may be of the continuous type wherein the sorbent is maintained in circulation through a reactivating unit (not shown) by way of pipe connections 111—112.

In practicing the method with the apparatus disclosed in Fig. 1, the gas flow from one or more closely located wells is conducted through the pipe line 1 under control of the flow regulator 47 so that the flow volume of the gas to be treated is substantially constant. The gas flow is divided and the major or primary stream is diverted through the branch 48 and the minor or secondary flow is diverted through the branch 49, the controlled flows being under regulation of the controller 51. The primary flow passes through the heat exchanger 4 to give up its heat to the treated gas discharged through the pipe 66. The gas on leaving the heat exchanger is at such temperature that a very large amount of the contained water content is condensed in the pipe leading to the separator 3. In the separator 3 the condensate gravitates to the bottom and is carried off through the pipe 54 under control of the valve 53. The separated gas containing water vapor rises to the top of the separator where, if partial dehydration is desired, it is discharged in separate streams through the outlet connection 10 to the 3-way valve 55 and through the pipe 58, the divided flows being proportioned by the control valve 64 that is activated by the dew point recorder 65 responsive to the dew point of the gas flowing through the discharge line 66 and whereby the dew point of the gas may be maintained at a substantially predetermined temperature upon setting of the instrument 65. If maximum dehydration is desired all the gas is discharged from the separator through the pipe 10 to the sorbent bed.

Attention is here called to the importance of cooling the incoming gas stream for effecting condensation and separation of much of the water content without otherwise treating the gas. This step makes it possible to reduce the overall content of the total gas by further treatment of a portion of the gas flow and mixture thereof with the flow which has not been contacted by the desiccant. Thus, the required dehydration is carried on with relatively small dehydrating vessels to make high pressure treatment of the gas practicable.

Assuming that the gas stream which is discharged through the outlet 10 is to be diverted to the dehydrator 6, the valve 55 will be set to connect with the pipe 57 so that the wet gas is conducted into the dehydrator 6 for downward flow through the desiccant 30 and on which the water vapor content of the gas is sorbed, the dry gas being discharged through the outlet connection 38 and pipe 62 leading to the valve 60, which valve 60 has been set to direct the flow of dry gas through the pipe 59 for mixture with the gas stream that is conducted from the separator. The dry gas thus reduces the overall content of the mixture. This method of reducing the water vapor content of the gas to the desired degree is possible through the high efficiency of the sorber and the extreme dryness of the portion of the gas that has been treated therein. The invention thus permits dehydration to a desired degree with small beds of desiccants since only a part of the gas need be brought into contact therewith.

The dried gas stream is expanded down to the desired discharge pressure required for the gathering system by means of the valve 63 for providing the temperature necessary in cooling the incoming gas to the point for effecting condensation. Thus, the cooling step is effected by expanding the dried gas so that the low temperatures produced by expansion do not cause freeze-ups or interference with the gas flow. It is also obvious that the cooling step is attained without refrigeration equipment but by the natural effects occurring when the gas is expanded down to the gathering line pressures.

After a period of time the desiccant in the sorber 6 approaches saturation and the valve 55 is set to divert the flow of wet gas from the outlet connection 10 of the separator to the pipe 56 for delivery to the sorber 5 wherein removal of the water vapor content is continued, the gas being discharged through the valve 60 which is now set to connect the pipe 61 with the pipe 59.

The secondary stream of gas flowing through the pipe 49 is discharged into the separator 2 where entrained water is separated and discharged through the pipe 13. Separated gas is discharged through the pipe 52 and passes through the control valve 67 into the heater 7 where the gas is heated to a sufficiently high temperature to dry the desiccant in the sorber 6. The heated gas is conducted to the inlet connection 34 by adjusting the valve 69 to connect the pipe 68 with the pipe 70. The hot gas travels through the body of desiccant 30 to effect removal of the sorbed moisture to be carried with the gas through the pipe 72 to the valve 73 which is adjusted to discharge the flow to the pipe 74 leading to the pipe 48 where the wet gas is mixed with the incoming gas stream and passed through the heat exchanger 4 where the moisture is condensed along with the condensible components of the incoming gas as previously described. It is thus obvious that the gas used in effecting reactivation of the desiccant is returned to the gas stream and passed through the sorber 5 to effect removal of the moisture. However, on first passing of the gas through the separator 3 practically all of the water content removed from the desiccant in the sorber 6 is separated and removed so that it is not detrimental to the action of the desiccant in the sorber 5. After the hot gas is passed through the sorber a sufficient length of time to dry the desiccant the desiccant is cooled by the bypassing of a portion of the gas from the pipe 52 by way of the bypass 75 and the valve 76 for flow through the sorber. If desired, the flow of hot gas and bypassed gas may be under automatic control of a time cycle or maximum temperature controller 77.

The method carried on with the apparatus shown in Fig. 2 is substantially the same with the exception that the condensate removed in the main separator is discharged through the dehydrator 87 and returned to the mixed gas flow on the discharge side of the expansion valve 97 to mix with the gas being discharged from the apparatus through the pipe 99.

From the foregoing it is obvious that I have provided an economical method for dehydrating gas at or near the well and at substantially well head pressure whereby the moisture content or dew point of the effluent gas may be maintained at any predetermined amount necessary to prevent the formation of hydrates in the flow lines leading to a gas processing plant, gas transportation system, or other market.

What I claim and desire to secure by Letters Patent is:

1. The process of dehydrating a wet gas stream at substantially high pressure including cooling the gas to effect condensation of liquefiable components of the gas stream removing condensates of the gas, sorbing water vapor from the gas stream, expanding the gas stream after the water vapor has been absorbed therefrom, and bringing the expanded gas stream into heat exchange contact with the wet gas stream to effect said cooling of the wet influent gas stream.

2. The process of dehydrating a wet gas stream at substantially high pressure including cooling the gas stream to effect condensation of liquefiable components of the gas stream, separating the liquid components from the gas stream, dividing the gas stream, sorbing water vapor from one of the gas streams, recombining the gas streams to reduce the relative total water vapor content of the mixture, expanding the recombined gas streams, bringing the expanded gas into heat exchange contact with the wet gas stream to effect said cooling of the wet gas stream, and controlling the relative proportions of the gas streams responsive to the dew point of the expanded gas after said heat exchange contact.

3. The process of dehydrating a wet gas stream at substantially high pressure including cooling gas stream in effect condensation of liquefiable components of the gas stream, removing said condensates of the gas, dividing the gas stream into separate streams, sorbing water vapor from one of the gas streams, recombining the gas streams in predetermined proportion to control the relative water vapor content of the mixture, expanding the combined gas streams and bringing the expanded gas into heat exchange contact with the wet gas stream to effect said cooling of the wet gas stream.

4. The process of dehydrating a wet natural gas stream flowing from a well into a gas transmission line including cooling the gas to effect condensation of liquefiable components of the gas stream, removing the condensate from the gas stream, sorbing water vapor from the gas stream at a pressure higher than pressure carried in the transmission line, expanding the gas stream after removal of the water vapor to substantially the pressure of the transmission line, and bringing the expanded gas stream into heat exchange contact with the wet gas stream prior to admitting the expanded gas into the transmission line to effect said cooling of the wet influent gas stream.

5. The process of dehydrating a wet natural gas stream flowing from a well into a gas transmission line, including cooling the gas stream to effect condensation of liquefiable components of the gas stream, removing said condensates of the gas, dividing the gas stream into separate streams, sorbing water vapor from one of the gas streams at a pressure higher than pressure carried in the transmission line, recombining the gas streams to reduce the water vapor content of the mixture, expanding the recombined gas streams, and bringing the expanded gas into heat exchange contact with the wet gas stream to effect said cooling of the wet gas stream.

6. The process of dehydrating a wet natural gas stream flowing from a well into a gas transmission line, including cooling the gas stream to effect condensation of liquefiable components of the gas stream, removing said condensates of the gas, dividing the gas stream into separate streams, sorbing water vapor from one of the gas streams, recombining the gas streams in predetermined proportion to control the water vapor content of the mixture, expanding the combined gas streams, and bringing the expanded gas into heat exchange contact with the wet gas stream to effect cooling of the wet gas stream.

7. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into main and secondary streams, heating the secondary gas stream, passing the heated secondary gas stream through the saturated sorbent bed for reactivating said bed, recombining the secondary gas stream with the main gas stream, cooling the recombined stream for effecting condensation of liquefiable components including the major portion of the moisture removed from the saturated sorbent bed, removing the condensate, passing the recombined stream after removal of the condensate into contact with said other bed to remove water vapor in said recombined main and secondary streams, expanding the dehydrated gas after contact with said sorbent, and bringing the expanded gas stream into heat exchange contact with said previously combined main and secondary gas streams to effect said cooling of said previously combined main and secondary gas streams.

8. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into main and secondary streams, separating water from the secondary stream, heating the secondary gas stream, passing the heated secondary gas stream through the saturated sorbent bed for reactivating said bed by removing the absorbed moisture, recombining the secondary gas stream containing the absorbed moisture with the main wet gas stream, cooling the recombined stream for effecting condensation of liquefiable components including the major portion of the absorbed moisture from the reactivated sorbent bed, removing the condensate including said condensate resulting from the absorbed moisture, passing the recombined stream after removal of said condensate into contact with said other bed to remove water vapor, expanding the dehydrated gas after contact with said sorbent, bringing the expanded gas stream into heat exchange contact with said previously combined gas streams to effect said cooling of the previously combined gas streams, and bypassing the secondary stream around the heating zone and into contact with said sorbent bed after reactivation by said heated secondary stream to cool said reactivated sorbent bed.

9. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into primary and secondary streams, heating the secondary gas stream, passing the heated secondary gas stream through the saturated sorbent bed for reactivating said bed, recombining the secondary gas stream with the primary gas stream, cooling the recombined primary and secondary gas streams for effecting condensation of liquefiable compounds including the absorbed moisture carried by the secondary stream from the reactivated sorbent bed, removing the condensate, dividing the gas stream into separate streams after removal of the condensate, passing one of said streams in contact with said other bed to remove water vapor, recombining said stream after removal of the water vapor with the other separated stream, expanding the combined gas streams, and bringing the expanded gas into heat exchange contact with said previously combined primary and secondary gas streams to effect said cooling of said combined primary and secondary gas streams.

10. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into primary and secondary streams, removing water from the secondary stream, heating the secondary gas stream, passing the heated secondary gas stream through the saturated sorbent bed for reactivating said bed, recombining the secondary gas stream with the primary gas stream, cooling the recombined stream for effecting condensation of liquefiable components, removing the condensate, dividing the gas stream into separate streams after removal of the condensate, passing one of said separate streams in contact with said other bed to remove water vapor, recombining said divided streams, expanding the combined gas streams, bringing the expanded gas into heat exchange contact with the previously combined primary and secondary gas streams to effect cooling of the previously combined primary and secondary gas streams, and bypassing the secondary stream around the heating zone and into contact with said sorbent bed after reactivation by said heated secondary stream to cool said reactivated sorbent bed.

11. The process of dehydrating a wet natural gas stream at substantially high pressure including cooling the gas stream to effect condensation of water and liquefiable hydrocarbon components of the gas stream, removing the condensates from the gas stream, separating the water from the liquefied hydrocarbons, sorbing water vapor from the gas stream, expanding the gas stream, reducing pressure on the liquefied hydrocarbons, recombining the liquefied hydrocarbons with the dehydrated gas stream, and bringing the combined liquid hydrocarbons and dehydrated gas into heat exchange contact with said wet gas stream to effect said cooling of the wet gas stream.

12. The process of dehydrating a wet natural gas stream at substantially high pressure including cooling the gas stream to effect condensation of water and liquefiable hydrocarbon components of the gas stream, removing the condensates from the gas stream, separating the water from the liquefied hydrocarbons, dividing the gas stream into separate streams, sorbing water vapor from one gas stream, recombining the separate gas streams in predetermined proportion to control the water vapor content of the mixture, expanding the gas stream, reducing pressure of the liquefied hydrocarbons, recombining the liquefied hydrocarbons with the dehydrated gas stream, and bringing the combined liquid hydrocarbons and dehydrated gas into heat exchange contact with the wet gas stream to effect said cooling of said wet gas stream.

13. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into main and secondary streams, heating the secondary gas stream, passing the heated secondary gas stream through the saturated sorbent bed for reactivating said bed, recombining the secondary gas stream with the main gas stream, cooling the recombined stream for effecting condensation of liquefiable components, removing the condensate, separating water from liquid hydrocarbon components of the condensate, passing the recombined stream in contact with said other bed to remove water vapor, expanding the dehydrated gas after contact with said sorbent bed and bringing the expanded gas stream into heat exchange contact with said previously combined gas streams to effect said cooling of the previously combined gas streams, and combining the liquid hydrocarbons with the dehydrated gas.

14. The process of dehydrating a wet gas stream at substantially high pressure, utilizing a plurality of sorbent beds whereby a saturated sorbent bed is adapted to be reactivated while another of said beds is used in sorbing moisture from the gas stream, including dividing the gas stream into main and secondary streams, removing water from the secondary stream, heating the secondary gas stream, passing the heated secondary gas stream through the saturated sorbent bed for reactivating said bed, recombining the secondary gas stream with the main gas stream, cooling the recombined stream for effecting condensation of liquefiable components, removing the condensate, separating water from liquid hydrocarbon components of the condensate, passing the recombined stream in contact with said other bed to remove water vapor, expanding the dehydrated gas after contact with said sorbent bed and bringing the expanded gas stream into heat exchange contact with said previously combined gas streams to effect said cooling of the previously combined gas streams, combining the liquid hydrocarbons with the dehydrated gas, and bypassing the secondary stream around the heating zone and into contact with said sorbent bed after reactivation by said heated secondary stream to cool said reactivated sorbent bed.

15. The process of dehydrating a wet gas stream at substantially high pressure including cooling the gas to effect condensation of liquefiable components of the gas stream, separating water from liquid hydrocarbons of said condensate, sorbing water vapor from the gas stream, expanding the gas stream, bringing the expanded gas stream into heat exchange contact with the wet gas stream to effect said cooling of the wet gas stream, and introducing the separated liquid hydrocarbons into the expanded gas stream responsive to accumulation of said liquid hydrocarbons.

16. The process of dehydrating a wet gas stream at substantially high pressure including cooling the gas stream to effect condensation of the liquefiable components of the gas stream, separating water from liquid hydrocarbons of said condensate, dividing the gas stream, sorbing water vapor from one of the gas streams, recombining the gas streams to reduce the relative total water vapor content of the mixture, expanding the recombined gas streams, introducing the separated liquid hydrocarbons into the expanded gas stream, and bringing the expanded gas into heat exchange contact with the wet gas stream to effect said cooling of the wet gas stream.

17. The process of dehydrating a wet gas stream at substantially high pressure including cooling the gas stream to effect condensation of liquefiable components of the gas stream, separating water from liquid hydrocarbons of said condensate, dividing the gas stream into separate streams, sorbing water vapor from one of the gas streams, recombining the gas streams in predetermined proportion to control the relative water vapor content of the mixture, expanding the combined gas streams, introducing the separated liquid hydrocarbons into the expanded gas stream, and bringing the expanded gas into heat exchange contact with the wet gas stream to effect said cooling of the wet gas stream.

18. The process of dehydrating a wet natural gas stream flowing from a well into a gas transmission line including cooling the gas to effect condensation of liquefiable components of the gas stream, removing the condensate from the gas stream, separating liquid hydrocarbons from the condensate, sorbing water vapor from the gas stream at a pressure higher than pressure carried in the transmission line, expanding the gas stream, introducing the separated hydrocarbons into the expanded gas stream, and bringing the expanded gas stream into heat exchange contact with the wet gas stream to effect said cooling of the wet gas stream.

19. The process of dehydrating a wet gas stream at substantially high pressure including cooling the gas stream to effect condensation of liquefiable components of the gas stream, removing said condensates of the gas, dividing the gas stream, sorbing water vapor from one of the gas streams, recombining the gas streams to reduce the total water vapor content of the mixture, expanding the recombined gas streams and bringing the expanded gas into heat exchange contact with the wet gas stream to effect said cooling of the wet gas stream, and controlling temperature of the wet gas stream by bypassing a portion of the expanded gas around the place of heat exchange.

20. The process of dehydrating a wet gas stream at substantially high pressure including cooling the gas stream to effect condensation of liquefiable components of the gas stream, removing said condensates of the gas stream, sorbing water vapor from the gas stream, expanding the gas heat exchange contact with the wet gas stream to stream, bringing the expanded gas stream into effect said cooling of the wet gas stream, and bypassing a portion of the expanded gas stream around the place of heat exchange to control temperature of the wet gas stream.

References Cited in the file of this patent

UNITED STATES PATENTS

| Number | Name | Date |
|---|---|---|
| 1,948,779 | Abbott et al. | Feb. 27, 1934 |
| 2,134,701 | Brewster | Nov. 1, 1938 |
| 2,248,956 | Carvlin et al. | July 15, 1941 |
| 2,258,015 | Keith, Jr., et al. | Oct. 7, 1941 |
| 2,359,660 | Martin et al. | Oct. 3, 1944 |

OTHER REFERENCES

"Charcoal as an Adsorbent," by James B. Garner, Natural Gas, November 1924, page 3.

"Gas Hydrates," by E. G. Hammerschmidt, American Gas Association Monthly, Mid-Summer, 1936, page 275.